United States Patent
Hasegawa et al.

(10) Patent No.: US 6,319,630 B1
(45) Date of Patent: Nov. 20, 2001

(54) LAMINATE FILM CASE COMPRISING NONAQUEOUS ELECTROLYTE BATTERY AND CONTROL CIRCUIT

(75) Inventors: Daisuke Hasegawa; Masataka Arakawa, both of Miyagi (JP)

(73) Assignee: Sony Corporation, Tokyo (JP)

( * ) Notice: Subject to any disclaimer, the term of this patent is extended or adjusted under 35 U.S.C. 154(b) by 0 days.

(21) Appl. No.: 09/516,886

(22) Filed: Mar. 2, 2000

(30) Foreign Application Priority Data

Mar. 12, 1999 (JP) .................................................. 11-067499

(51) Int. Cl.[7] .............................. H01M 6/46; H01M 4/58
(52) U.S. Cl. ........................ 429/162; 429/163; 429/179; 429/161; 429/127; 429/124; 429/7; 429/231.95
(58) Field of Search ..................................... 429/127, 124, 429/7, 163, 162, 161, 179, 231.95

(56) References Cited

FOREIGN PATENT DOCUMENTS

| | | |
|---|---|---|
| 0390557A2 | 10/1990 | (EP) . |
| 0499005A2 | 8/1992 | (EP) . |
| 0862227A1 | 9/1998 | (EP) . |
| 0390557 A2 * | 10/1990 | (EP) .............................. H01M/10/40 |
| 98/38689 | 9/1998 | (WO) . |
| WO98/38689 * | 9/1998 | (WO) .......................... H01M/10/46 |

* cited by examiner

*Primary Examiner*—Gabrielle Brouillette
*Assistant Examiner*—Angela J. Martin
(74) *Attorney, Agent, or Firm*—Sonnenschein, Nath & Rosenthal

(57) ABSTRACT

A nonaqueous electrolyte battery is disclosed which is capable of realizing a sufficiently large space for accommodating a control circuit and preventing enlargement of the size thereof. The nonaqueous electrolyte battery incorporating a case constituted by a laminate film and arranged to accommodate a battery element which is enclosed by heat welding; and electrode terminal leads which are electrically connected to electrodes constituting the battery element and which are extended to the outside of the case such that the electrode terminal leads are sandwiched by a heat welded portion, wherein the nonaqueous electrolyte battery has a rectangular outer shape, two corners of one side of four sides of the nonaqueous electrolyte battery from which the electrode terminal leads extend to the outside of the nonaqueous electrolyte battery are cut, bent such that the width of each of heat welded portions corresponding to the other sides is smaller than the thickness of the nonaqueous electrolyte battery and inwards folded back along the side surface of the battery element so that a space is created and a control circuit for the nonaqueous electrolyte battery is accommodated in the space.

13 Claims, 11 Drawing Sheets

LAMINATE FILM CASE COMPRISING NONAQUEOUS ELECTROLYTE BATTERY AND CONTROL CIRCUIT

RELATED APPLICATION DATA

The present application claims priority to Japanese Application No. P11-067499 filed Mar. 12, 1999 which application is incorporated herein by reference to the extent permitted by law.

BACKGROUND OF THE INVENTION

1. Field of the Invention

The present invention relates to a nonaqueous electrolyte battery incorporating a case constituted by a laminate film accommodating a battery element.

2. Description of the Related Art

In recent years, a multiplicity of portable electronic apparatuses, such as camcoders, portable telephones and portable computers, are coming. An attempt has been made to reduce the size and weight of the apparatuses. As a portable power source for the electronic apparatuses, batteries, in particular, secondary batteries, and more particularly nonaqueous secondary batteries (so-called lithium-ion batteries) have energetically researched and developed to realize a thin and foldable battery.

As an electrolyte having a variable shape, a solidified electrolytic solution has energetically been researched and developed. In particular, attraction is being given to a gel electrolyte which is a solid electrolyte containing a plasticizer and a polymer and solid electrolyte containing a lithium salt dissolved in the polymer.

To use the advantageous characteristics of the small thickness and weight of the foregoing battery, a variety of batteries have been studied. The batteries are batteries which incorporate so-called laminate films each of which is constituted by a plastic film or by bonding a plastic film and a metal member to accommodate the battery element.

For example, the secondary battery must incorporate a control circuit arranged to control the charge and discharge operations and disposed in a periphery of the battery. Therefore, the structure must be formed such that a sufficiently large space is created to mount the charge and discharge control circuit while enlargement of the size is being prevented.

When the battery is accommodated in a container, the size of the battery must be reduced and dispersion of the sizes must be prevented. If the size varies considerably, an operation for inserting the battery into the container cannot easily be performed.

SUMMARY OF THE INVENTION

Accordingly, an object of the present invention is to provide a nonaqueous electrolyte battery which is capable of creating a sufficient large space for mounting a control circuit and reducing the size thereof and which exhibits a satisfactory volume efficiency.

Another object of the present invention is to provide a nonaqueous electrolyte battery exhibiting satisfactory productivity.

To achieve the objects, according to one aspect of the present invention, there is provided a nonaqueous electrolyte battery comprising: a case constituted by a laminate film and arranged to accommodate a battery element which is enclosed by heat welding; and electrode terminal leads which are electrically connected to electrodes constituting the battery element and which are extended to the outside of the case such that the electrode terminal leads are sandwiched by a heat welded portion, wherein the nonaqueous electrolyte battery has a rectangular outer shape, two corners of one side of four sides of the nonaqueous electrolyte battery from which the electrode terminal leads extend to the outside of the nonaqueous electrolyte battery are cut, bent such that the width of each of heat welded portions corresponding to the other sides is smaller than the thickness of the nonaqueous electrolyte battery and inwards folded back along the side surface of the battery element so that a space is created and a control circuit for the nonaqueous electrolyte battery is accommodated in the space.

The control circuit for the battery is accommodated in a space created by folding the heat welded portion of the case so that a space in the battery in which the battery element is not present can effectively be used. Therefore, the volume efficiency can considerably be improved.

Note that the heat welded portions cannot easily be folded with clear creases. Therefore, there arises a problem in that the size of the control circuit which can be accommodated is limited. What is worse, the sizes of the batteries cannot be uniformed.

Therefore, the present invention has the structure that the two corners of the heat welded portion of one side from which the electrode terminal leads are extended to the outside are cut to overcome the above-mentioned problem.

Since the corners are cut, projection of the heat welded portions which have been folded to the upper space can be prevented. Hence it follows that a satisfactorily large space for accommodating the control circuit can be created.

Moreover, dispersion of sizes of the batteries can be prevented. When the heat welded portions which have been folded are secured with adhesive agent, dispersion of the sizes can substantially be prevented. Moreover, the size of the battery can be reduced.

Other objects, features and advantages of the invention will be evident from the following detailed description of the preferred embodiments described in conjunction with the attached drawings.

DETAILED DESCRIPTION OF THE PREFERRED EMBODIMENTS

The structure of a nonaqueous electrolyte battery according to the present invention will now be described with reference to the drawings.

Figure 1:
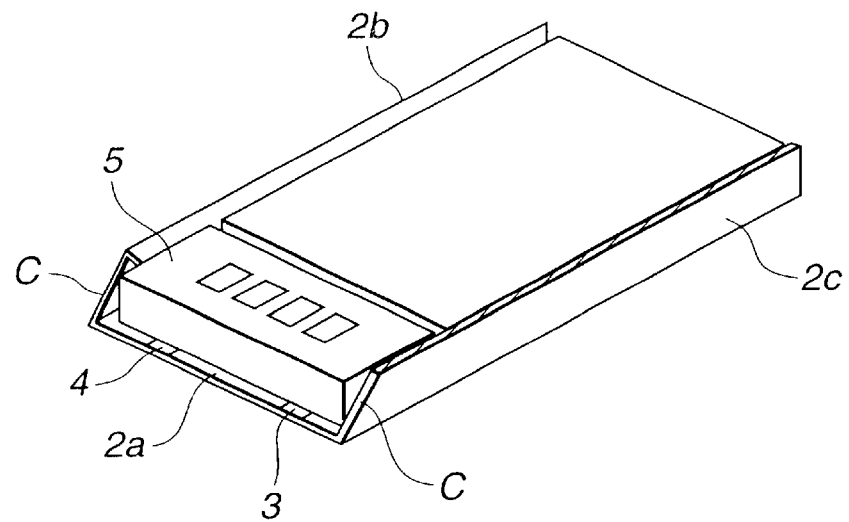
FIG. 1 is a schematic perspective view showing an example of the structure of a nonaqueous electrolyte battery according to the present invention.
Figure 2:
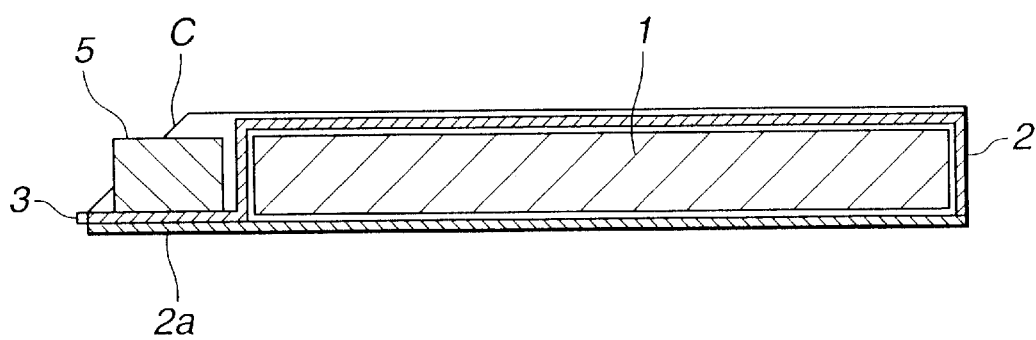
FIG. 2 is a schematic cross sectional view showing an example of the structure of the nonaqueous electrolyte battery according to the present invention.

The nonaqueous electrolyte battery according to the present invention (a so-called lithium-ion secondary battery) is, for example, a solid-electrolyte battery, a solid-electrolyte battery incorporating a gel electrolyte or a gel-electrolyte battery. As shown in FIGS. 1 and 2, a battery element 1 incorporates a positive-electrode active-material layer and a negative-electrode active-material layer between which the solid electrolyte or a gel electrolyte is disposed. The battery element 1 is accommodated in a case 2 constituted by a laminate film. The periphery of the case 2 is welded with heat so that the battery element 1 is hermetically accommodated. The shape of the nonaqueous electrolyte battery has a substantially rectangular shape.

The battery element 1 is provided with a negative-electrode terminal lead 3 which is electrically connected to a negative electrode constituting the battery element 1 and a positive-electrode terminal lead 4 which is electrically connected to the positive electrode. The negative-electrode terminal lead 3 and the positive-electrode terminal lead 4 are extended to the outside of the case 2.

The negative-electrode terminal lead 3 and the positive-electrode terminal lead 4 are connected to the collectors of the positive and negative electrodes. The positive-electrode terminal lead 4 may be made of material which is not fused with a high potential and which is exemplified by aluminum, titanium and their alloy. The negative-electrode terminal lead 3 may be made of copper, nickel or their alloy.

The body and the control circuit of the lithium-ion secondary battery are packed in a so-called decorative case so that the product of the battery is manufactured.

It is required that the limited space in the battery is effectively used to accommodate the battery elements as much as possible to improve the volume efficiency and the performance.

The volume efficiency of a battery of a type constituted by packing a flat battery in a laminate film depends on the method of forming the sealing portion. If the capacity of the battery is not changed, it is an important fact to reduce the thickness of the battery. When the thickness of a battery having a thickness of 3 mm is enlarged by 100 μm, the volume efficiency deteriorates by 3%. When the thickness of a battery having a thickness of 0.5 mm is enlarged by 100 μm, the volume efficiency deteriorates by 20%.

As for a direction in which the terminal leads are extended to the outside of the battery, a structure has been disclosed in, for example, Japanese Patent Laid-Open No. 10-208710. According to the disclosure, the surface of the collector of the battery element is used to extend the terminal leads from a portion except for the heat welded portion of the laminate film. When the connection with the control circuit is considered, the line which must be connected to the control circuit is undesirably disposed in the direction of the thickness of the battery. Therefore, the volume efficiency undesirably deteriorates in a state of a final product in which the body of the battery and the control circuit are packed in the decorative case.

Therefore, a heat welded portion 2a of the laminate film sandwiches the negative-electrode terminal lead 3 and the positive-electrode terminal lead 4, as shown in FIGS. 1 and 2. Moreover, the negative-electrode terminal lead 3 and the positive-electrode terminal lead 4 are extended to the outside from the heat welded portion 2a.

Then, the control circuit 5 is placed in a created space in which the battery element 1 is not disposed. Thus, the battery element 1 and the control circuit 5 are electrically connected to each other. In addition, the control circuit 5 is held on the heat welded portion 2a of the case 2 in a stable state against vibrations and impacts.

When the case 2 has the space capable of accommodating the battery element 1 and formed by, for example, deep drawing, the space for accommodating the control circuit 5 can effectively be created to effectively use the space.

The process of the heat welded portion of the case 2 in a direction except for the direction in which the terminal leads are extended to the outside will now be described. Heat welded portions 2b and 2c corresponding to the two sides perpendicular to the heat welded portion 2a from which the terminal leads are extended to the outside are bent one or more times so as to be folded to the ends adjacent to the battery. Thus, the length of the battery in the direction of the thickness of the battery is shortened. As a result, the folded portion, that is, the heat welded portions 2b and 2c protect the battery including the control circuit 5.

As described above, the heat welded portions 2b and 2c are folded to the ends adjacent to the battery to shorten the length of the battery in the direction of the thickness of the battery. Thus, the volume efficiency can significantly be improved. In a case of a battery element having a thickness of 3.3 mm, the volume efficiency can be improved by about 5%. In a case of a battery element having a thickness of 0.5 mm, the volume efficiency can considerably be improved by about 25%.

The folded heat welded portions 2b and 2c protect the side surfaces of the control circuit 5 from external impact. Therefore, the above-mentioned structure enables a battery to be obtained which exhibits a satisfactory volume energy efficiency with respect to the size of the battery including the control circuit and excellent impact resistance.

When the corners at which the heat welded portions 2a and 2c intersect and the corners at which the heat welded portion 2a and the heat welded portion 2c intersect are left from folding of the heat welded portions 2b and 2c, the portions project. In the foregoing case, the size of the space for accommodating the control circuit 5 is reduced.

Moreover, the folded heat welded portions 2b and 2c become instable, causing the size to be dispersed.

Figure 3:
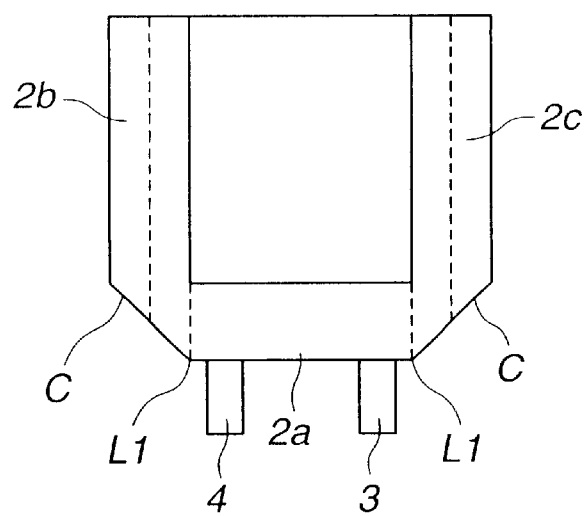
FIG. 3 is a schematic plan view showing an example of cutting.

Therefore, the present invention has a structure as shown in FIG. 3 and formed such that the two corners of the heat welded portion 2a, that is, the corner at which the heat welded portion 2a and the heat welded portion 2b intersect and the corner at which the heat welded portion 2a and the heat welded portion 2c intersect are cut to the position of a first bending line L1. Thus, a cut portion C is formed to satisfactorily prevent projection.

Since the diagonal cut portion C is formed as described above, projection of the portions to the space for accommodating the control circuit 5 can be reduced. Hence it follows that the space for accommodating the control circuit 5 can be enlarged.

Figure 4:
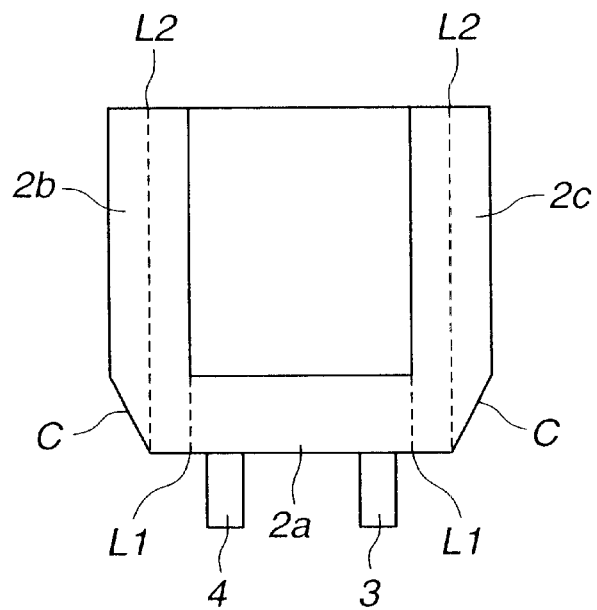
FIG. 4 is a schematic plan view showing another example of cutting.
Figure 5:
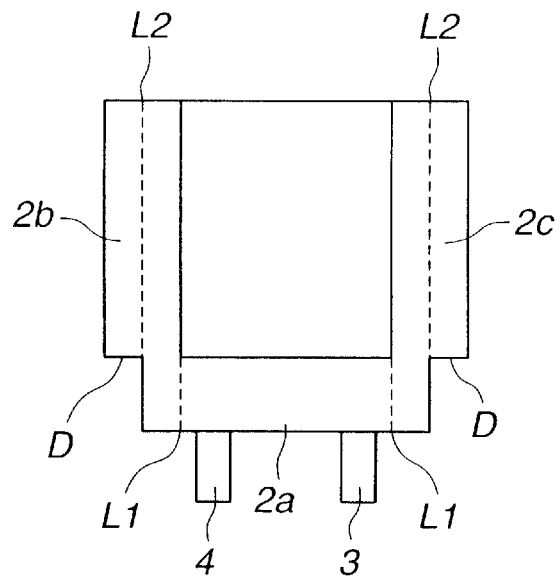
FIG. 5 is a schematic plan view showing another example of cutting.

Note that the shape of the cut portion is not limited to the foregoing shape. For example, a shape as shown in FIG. 4 may be employed in which only the outside portion of a bending line L2 is diagonally cut to form the cut portion C. Another shape as shown in FIG. 5 may be employed in which a cut portion D in the form of a stepped shape is formed by cutting a region to the bending line L2 into a rectangular shape.

Figure 6:
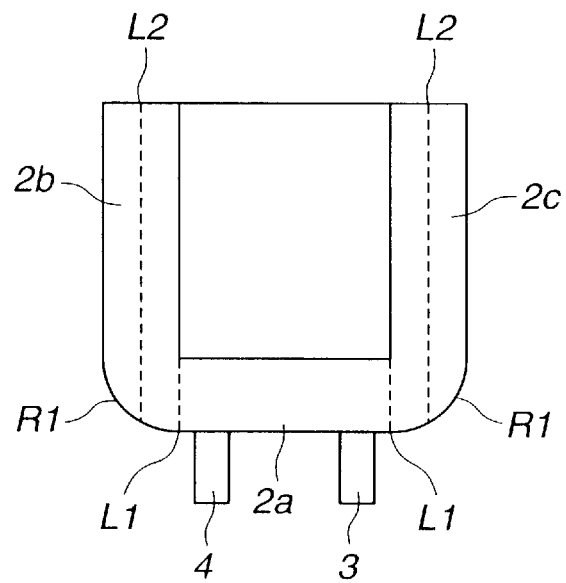
FIG. 6 is a schematic plan view showing another example of cutting.
Figure 7:
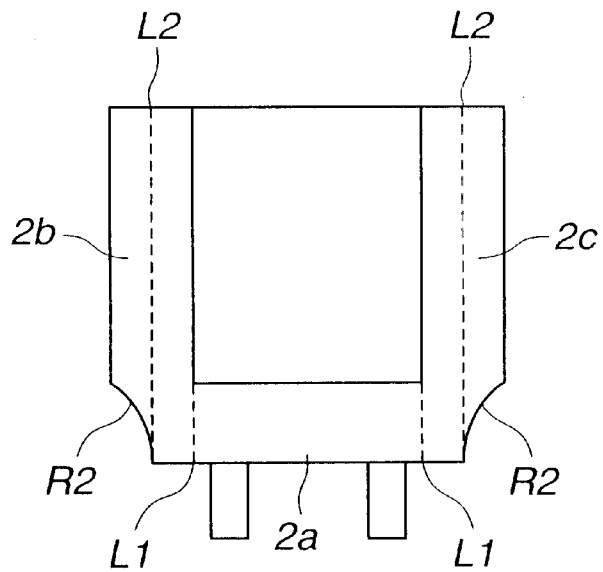
FIG. 7 is a schematic plan view showing another example of cutting.

A circular-arc shape cut portion R1 as shown in FIG. 6 or an inverted circular-arc cut portion R2 as shown in FIG. 7 may be employed. In the former case, the length of the heat welded portion which must be sealed can be uniformed to conveniently realize rigidity against introduction of water and internal pressure. In the latter case, no corner is formed in the portion in which the length of the sealed portion is short as distinct from the cut portion D in the form of the stepped portion as shown in FIG. 5. Also satisfactory rigidity against introduction of water and internal pressure can conveniently be realized.

When the cut portion is formed, the amount of cutting may arbitrarily be determined. To reliably prevent introduction of water, it is preferable that the sealing length in the cutting portion is 3 mm or longer.

To furthermore reduce the size of the battery including the folded heat welded portions 2b and 2c, it is effective to perform a bonding process using adhesive agent. When the bonding process using the adhesive agent is performed, the state of bending of the folded heat welded portions 2b and 2c can be stabilized. Thus, the size can be reduced and dispersion of the size can be prevented.

When the battery element 1 of, for example, a solid-electrolyte battery or a gel electrolyte battery is manufactured, the polymer and solid electrolyte may be made of polymer material exemplified by silicon gel, acrylic gel, acrylonitrile gel, polyphosphagen denatured polymer, polyethylene oxide, polypropylene oxide, their composite polymers, crosslinked polymers, denatured polymers or fluorine polymers which are exemplified by poly (vinylidene fluoride), poly (vinylidene fluoride-co-hexafluoropropylene), poly (vinylidene fluoride-co-tetrafluoroethylene), poly (vinylidene fluoride-co-trifluoroethylene) and their mixtures. As a matter of course, the material is not limited to this.

The solid electrolyte or the gel electrolyte laminated in the active-material layer of the positive electrode or the active-material layer of the negative electrode is obtained by causing the active-material layer of the positive electrode or the active-material layer of the negative electrode to be impregnated with solution composed of a polymer compound, an electrolyte salt and solvent (and a plasticizer in the case of the gel electrolyte). Then, the solvent is removed so that the solution is solidified. A portion of the solid electrolyte or the gel electrolyte laminated on the active-material layer of the positive electrode or the active-material layer of the negative electrode is impregnated with the active-material layer of the positive electrode or the active-material layer of the negative electrode so that the portion is solidified. In the case of the crosslinked material, light or heat is used to crosslink the material so as to be solidified.

The gel electrolyte is composed of a plasticizer containing a lithium salt and 2 wt % to 30 wt % matrix polymer. At this time, ester, ether or carbonate may be employed solely or as a component of the plasticizer.

When the gel electrolyte is prepared, a matrix polymer for gelling the carbonate may be any one of a variety of polymers for use to constitute the gel electrolyte. From a viewpoint of stability of oxidation and reduction, it is preferable that a fluorine polymer, such as poly (vinylidene fluoride) or poly (vinylidene fluoride-co-hexafluoropropylene), is employed.

The solid polymer electrolyte is composed of a lithium salt and a polymer compound for dissolving the lithium salt. The polymer compound may be ether polymer, such as poly (ethylene oxide) or its crosslinked material, poly (methacrylate) ester, acrylate material, fluorine polymer, such as poly (vinylidene fluoride) or poly (vinylidene fluoride-co-hexafluoropropylene). The material may solely be employed or their mixture may be employed. From a viewpoint of stability of oxidation and reduction, it is preferable that a fluorine polymer, such as poly (vinylidene fluoride) or poly (vinylidene fluoride-co-hexafluoropropylene), is employed.

The lithium salt which is contained in the gel electrolyte or the solid polymer electrolyte may be the lithium salt for use in a usual electrolytic solution for a battery. The lithium compound (salt) may be the following materials. Note that the present invention is not limited to the following materials.

The lithium compound (salt) is exemplified by lithium chloride, lithium bromide, lithium iodide, lithium chlorate, lithium perchlorate, lithium bromate, lithium iodate, lithium nitrate, lithium tetrafluoroborate, lithium hexafluorophosphate, lithium acetate, bis (trifluoromethanesulfonyl) imide lithium, $LiAsF_6$, $LiCF_3SO_3$, $LiC(SO_2CF_3)_3$, $LiAlCl_4$ and $LiSiF_6$.

The foregoing lithium compound may solely be employed or a plurality of the lithium compounds may be mixed. From a viewpoint of stability of oxidation, it is preferable that $LiPF_6$ or $LiBF_4$ is employed.

The concentration of the lithium salt which must be dissolved will now be described. In the case of the gel electrolyte, 0.1 mol to 3.0 mol may be dissolved in the plasticizer. It is preferable that the concentration is 0.5 mol/litter to 2.0 mol/litter.

The battery according to the present invention may have a structure of a conventional lithium-ion battery except for the structure that the gel electrolyte or the solid electrolyte is employed.

That is, the material of th e negative electrode of a lithium-ion battery may be a material which permits doping/dedoping of lithium. The material for constituting the negative electrode, for example, may be non-graphitizing carbon or graphite. Specifically, any one of the following materials may be employed: pyrocarbon, cokes (pitch cokes, needle cokes or petroleum cokes), graphite, vitreous carbon, a sintered material of organic polymer compound (material obtained by baking phenol resin or furan resin at a proper temperature so as to be carbonized), carbon fiber and active carbon. As the material which permits doping/dedoping of lithium, polymer, such as polyacetylene or polypyrrole, or an oxide, such as $SnO_2$, may be employed. When the negative electrode is constituted by the foregoing material, a known binder or the like may be added.

The positive electrode may be constituted by using metal oxide, metal sulphide or specific polymer as the active material of the positive electrode. When a lithium battery is constituted, the active material of the positive electrode may be metal sulphide or oxide, such as $TiS_2$, $MoS_2$, $NbSe_2$ or $V_2O_5$, which does not contain lithium, or lithium composite oxide mainly composed of $Li_xMO_2$ (where M is one or more types of transition metal, x varies depending on a state of charge/discharge and it is 0.05 or more and 1.10 or less). As the transition metal M which constitutes the lithium composite oxide, it is preferable that Co, Ni or Mn is employed. The lithium composite oxide is exemplified by $LiCoO_2$, $LiNiO_2$, $LiNi_yCo_{1-y}O_2$ (where 0<y<1) and $LiMn_2O_4$. The foregoing lithium composite oxide is an excellent active material of the positive electrode which is capable of generating high voltage and which exhibits a satisfactory energy density. The positive electrode may be constituted by combining a plurality of types of the foregoing active materials of the positive electrode. When the positive electrode is constituted by using the foregoing active material of the positive electrode, a known conductive material and a binder may be added.

The battery element 1 may be formed into a laminate structure in which the positive electrode and the positive electrode are alternately laminated such that the solid electrolyte is sandwiched. A wound structure may be employed in which the positive electrode and the negative electrode are laminated such that the solid electrolyte is sandwiched and the sandwich structure is wound. A folded structure may be employed in which the positive electrode and the negative electrode are laminated such that the solid electrolyte is sandwiched to alternately folding the laminate. The structure may arbitrarily be employed.

The present invention may be applied to a primary battery or the secondary battery. When the present invention is applied to a nonaqueous electrolyte battery, a great effect can be obtained.

The nonaqueous electrolyte battery has the above-mentioned basic structure. To describe the structure, a manufacturing procedure will now be described.

Figure 8:
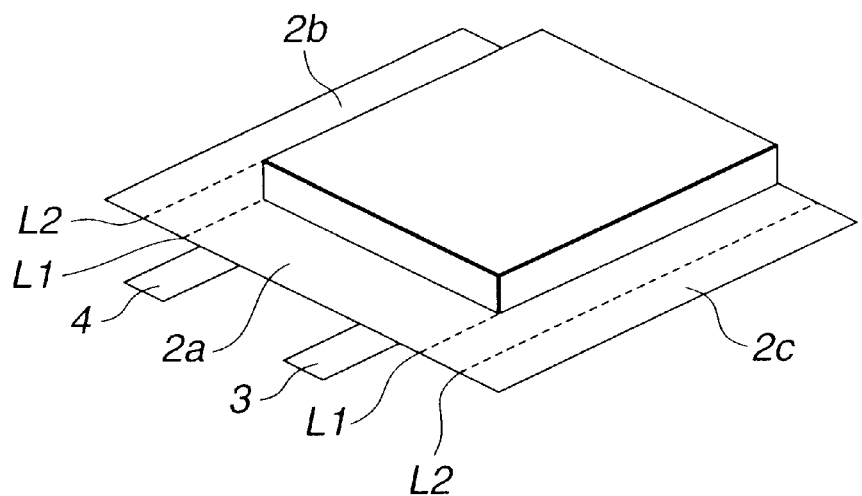
FIG. 8 is a schematic perspective view showing a procedure for manufacturing the battery in which the battery is enclosed in a case.
Figure 9:
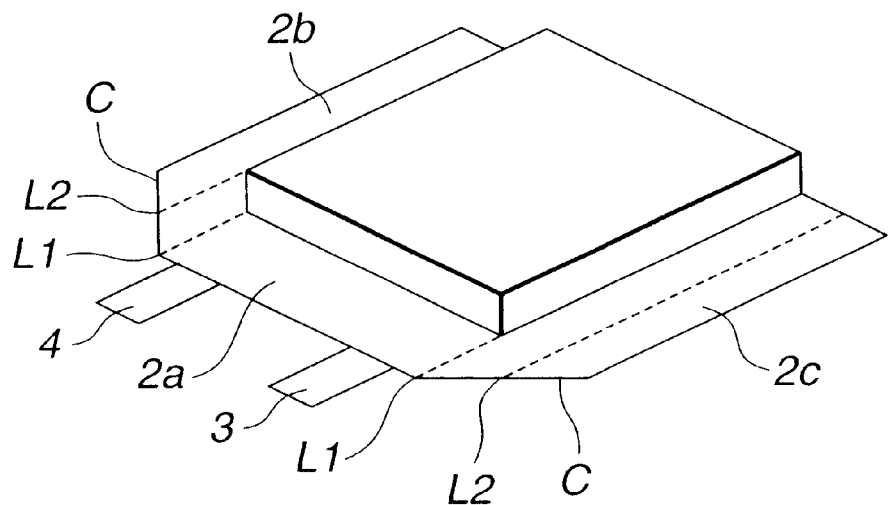
FIG. 9 is a schematic perspective view showing a process for forming a cut portion.

To manufacture the nonaqueous electrolyte battery, the battery element 1 is accommodated in the case 2 constituted by the laminate film, as shown in FIG. 8. Then, the periphery of the case 2 is welded with heat so that the battery element 1 is enclosed. Then, as shown in FIG. 9, the two corners of the heat welded portion 2a are diagonally cut so that the cut portion C is formed.

Figure 10:
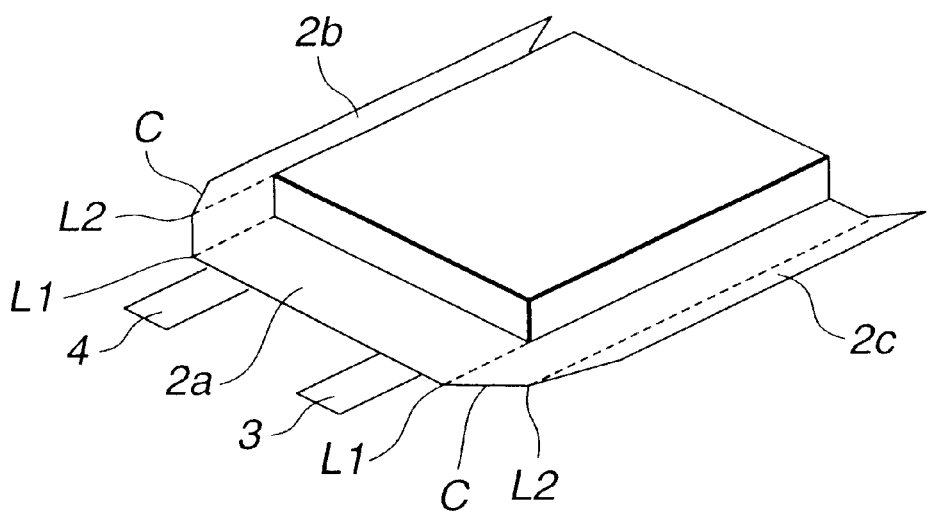
FIG. 10 is a schematic perspective view showing a process for forming an easily-bent portion.
Figure 11:
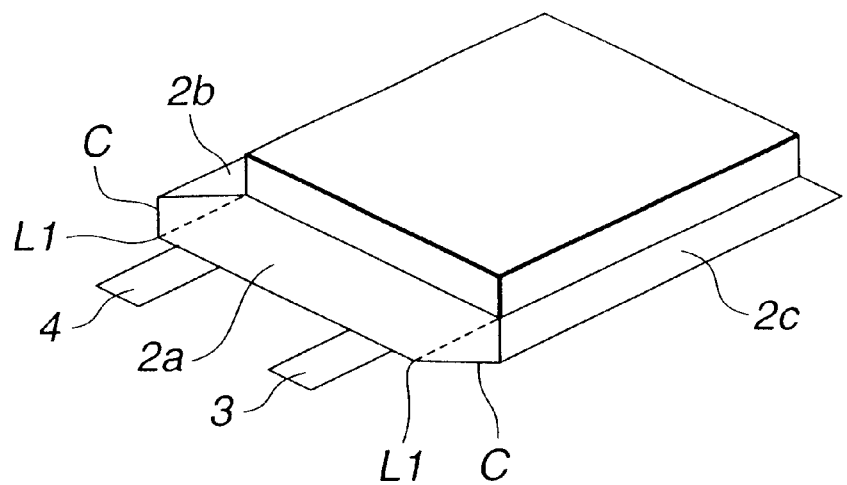
FIG. 11 is a schematic perspective view showing a bending process.

Then, the heat welded portions 2b and 2c are first bent at an intermediate position (along the bending line L2) as shown in FIG. 10. Then, the heat welded portions 2b and 2c are bent along the side surfaces (the bending lines L1) of the battery element 1. The folding operation is completed by two steps of the bending operations. As shown in FIG. 10, primary bending is performed as shown in FIG. 10, and then bending is performed tightly, as shown in FIG. 11.

Figure 12:
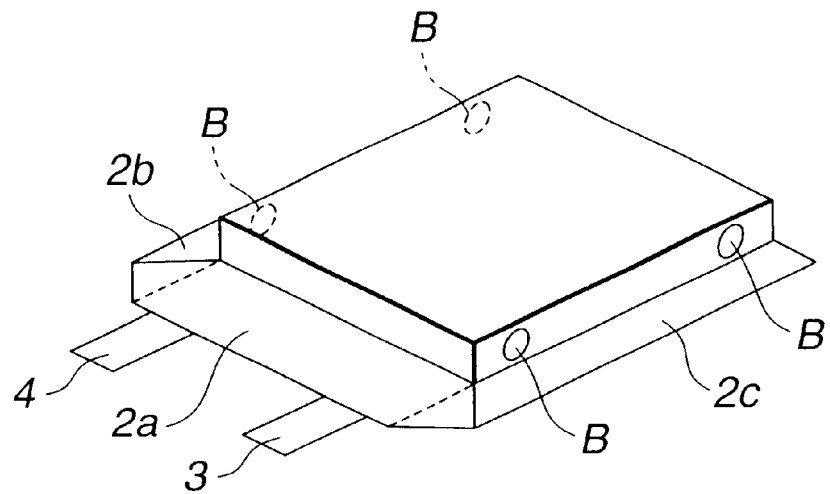
FIG. 12 is a schematic perspective view showing a process for applying adhesive agent.
Figure 13:
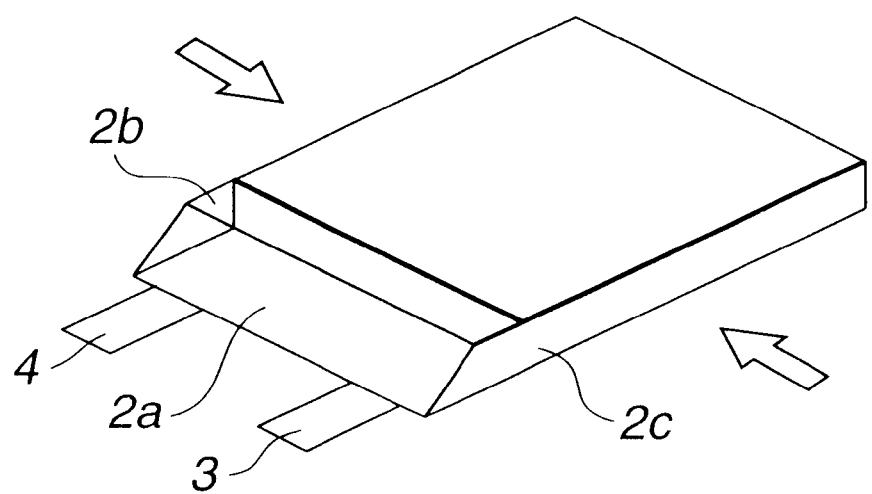
FIG. 13 is a schematic perspective view showing a process for securing the heat welded portion.

Then, the four corners are coated with adhesive agent B, as shown in FIG. 12 so that the folded heat welded portions 2b and 2c are bonded and secured, as shown in FIG. 13.

To perform the bending operation, it is preferable that a special jig is employed. The bending jig will now be described.

Figure 14:
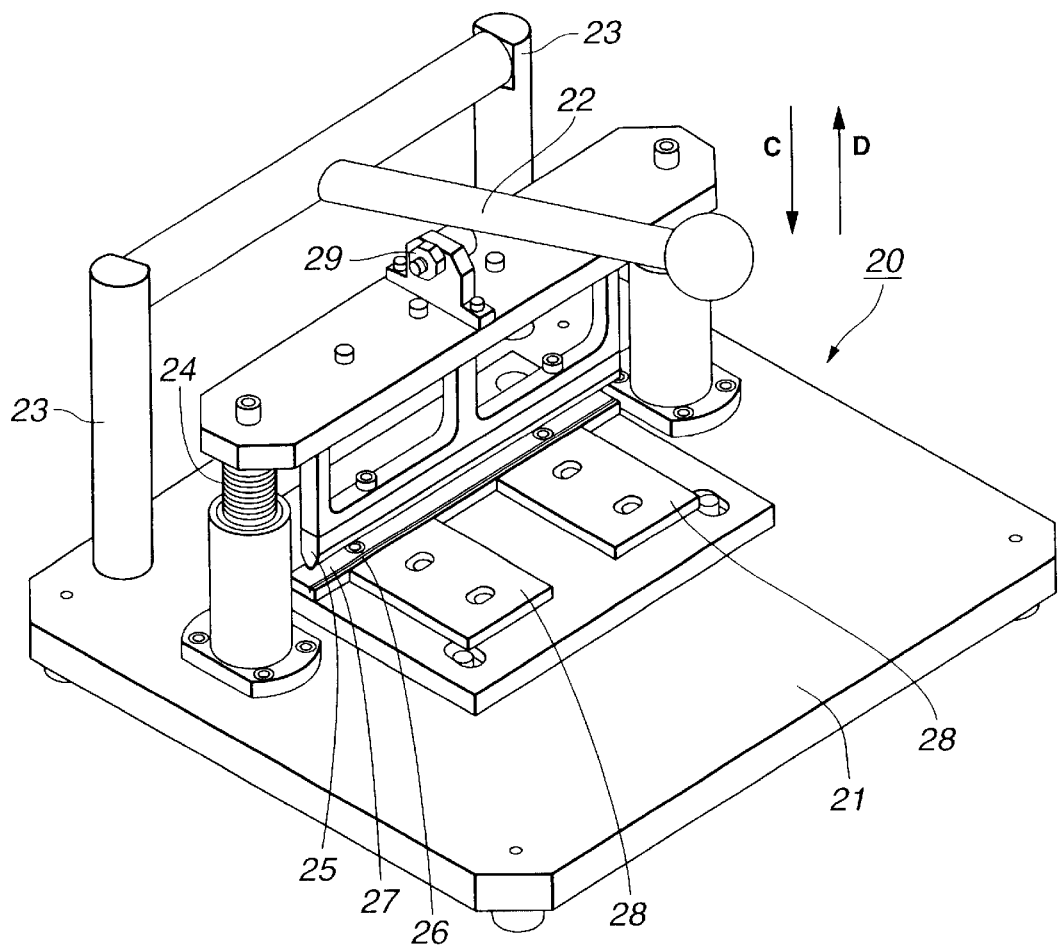
FIG. 14 is a perspective view showing the schematic structure of a bending jig.

As shown in FIG. 14, the bending jig 20 incorporates a stand 23 for rotatively supporting a T-shape lever 22 on a base frame 21; a blade 25 urged in a direction indicated with an arrow D shown in FIG. 14 by a coil spring 24 and capable of moving upwards and downwards in directions indicated with arrows C and D shown in FIG. 14; a V-groove block 27 having a V-shape groove 26 formed immediately below the blade 25; and a guide plate 28 disposed adjacent to the V-groove block 27 and arranged to guide the set position of the nonaqueous electrolyte battery.

When the lever 22 of the bending jig 20 is depressed in the direction indicated with the arrow C shown in FIG. 14, the blade 25 is pushed downwards through a cam follower 29 provided for the blade 25. Thus, the blade 25 is moved downward in the direction indicated with the arrow C shown in FIG. 14. After the blade 25 of the bending jig 20 has been moved downwards, the leading end of the blade 25 is engaged to the inside portion of the groove 26 formed on the upper surface of the V-groove block 27 formed immediately below the blade 25. The leading end of the blade 25 is formed into a shape having a triangle-like cross section having two V-like sides to correspond to the shape of the groove 26.

Figure 15A:
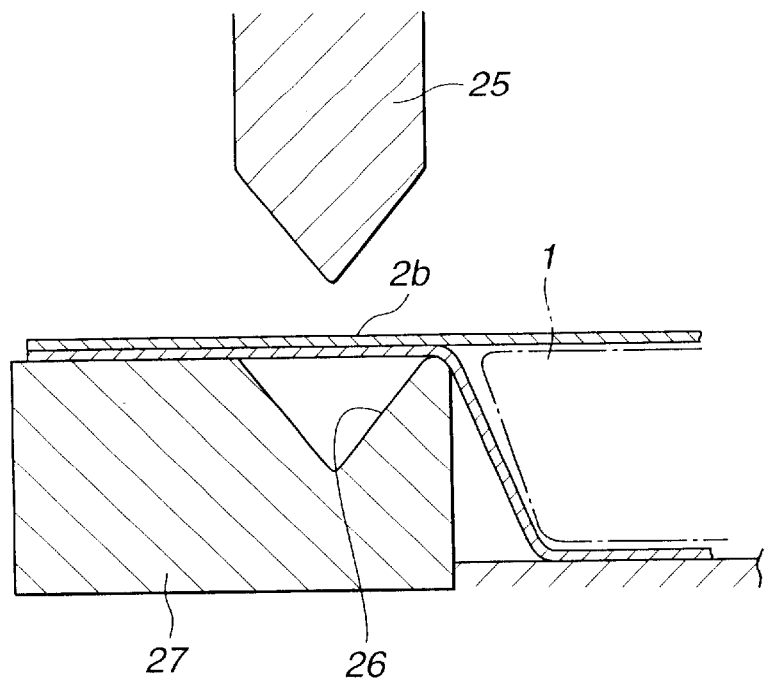
FIG. 15 is schematic cross sectional view showing a bending process using the bending jig.

To bend the heat welded portions 2b and 2c by the bending jig 20 having the above-mentioned structure, the nonaqueous electrolyte battery is set on the bending jig 20 by aligning the position by using the guide plate 28 and the V-groove block 27. At this time, the nonaqueous electrolyte battery is set such that the heat welded portion 2b is placed above the groove 26 of the V-groove block 27, as shown in FIG. 15A.

Figure 15B:
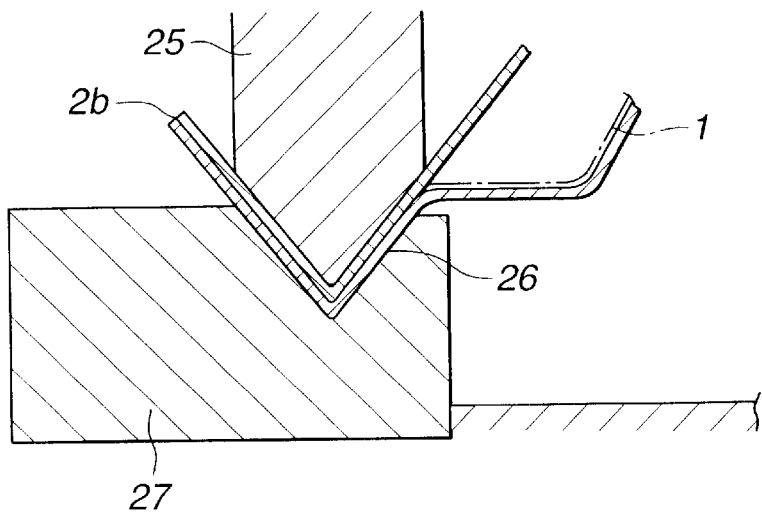

Then, the lever 22 is depressed in the direction indicated with the arrow C shown in FIG. 14 to downwards move the blade 25 until it is stopped. The blade 25 which has been moved downwards is brought into contact with the heat welded portion 2b of the nonaqueous electrolyte battery positioned above the groove 26 so as to be pressed into the groove 26. As a result, the heat welded portion 2b is pressed against the inside portion of the groove 26. Thus, the heat welded portion 2b is bent into the V-like shape, as shown in FIG. 15B.

Then, also the opposite heat welded portion 2c is similarly bent by using the bending jig 20 so that the heat welded portion 2c is easily bent. After both of the heat welded portions 2b and 2c have been bent, the nonaqueous electrolyte battery is removed from the bending jig 20.

When the shapes of the groove 26 and the blade 25 are changed, the heat welded portions 2b and 2c can be bent to make a required angle. Although both of the groove 26 and the blade 25 bend the heat welded portions 2b and 2c into the V-like shape, the heat welded portions 2b and 2c may be bent to have a curvature R. In the foregoing case, the bending jig 20 is provided with a groove having the curvature R which is imparted to the heat welded portions 2b and 2c and a blade having a leading end formed to have the curvature R to correspond to the shape of the groove.

The thus-manufactured nonaqueous electrolyte battery 10 is accommodated in, for example, a case 11 when the nonaqueous electrolyte battery is handled.

Figure 16:
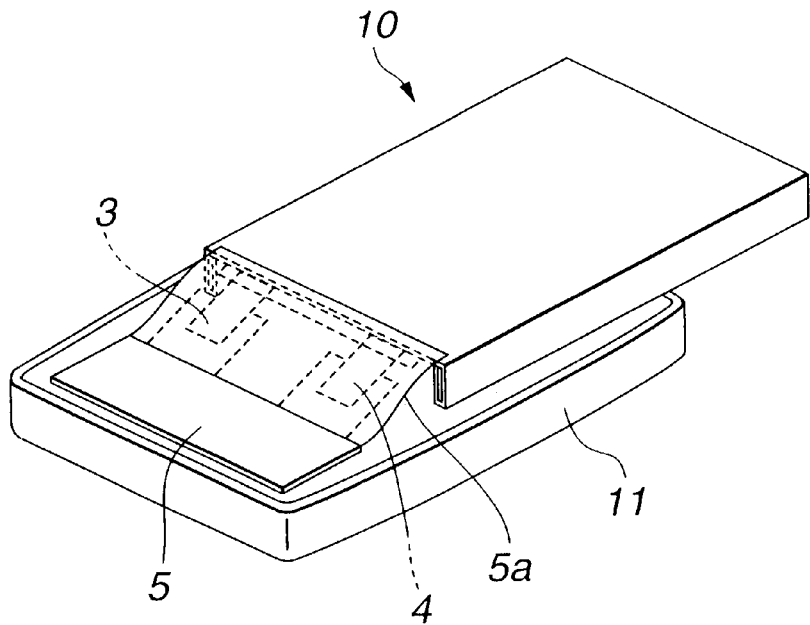
FIG. 16 is a schematic perspective view showing an operation for inserting the nonaqueous electrolyte battery into a case and a state in which a case is mounted.
Figure 17:
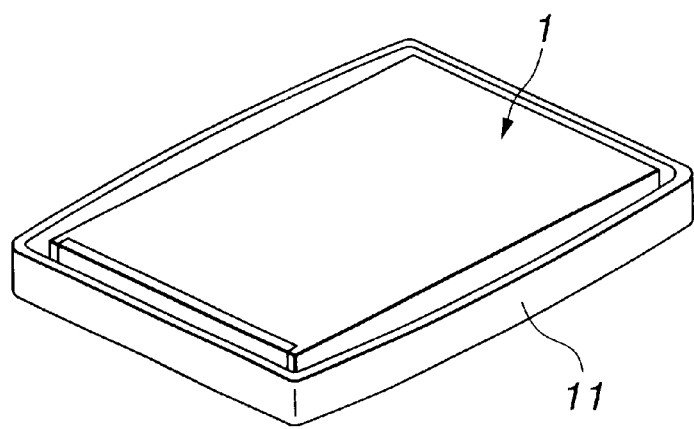
FIG. 17 is a perspective view showing a state in which the nonaqueous electrolyte battery has been accommodated in the case.

FIG. 16 shows a method of inserting the nonaqueous electrolyte battery 10 into the case 11. To insert the nonaqueous electrolyte battery 10 into the case 11, initially the control circuit 5 is accommodated at a predetermined position, as shown in FIG. 16. A printed circuit board 5a (in this portion, the negative-electrode terminal lead 3, the positive-electrode terminal lead 4 and the control circuit 5 are electrically connected) for connecting the control circuit 5 and the battery element 1 to each other is folded. Thus, a state of accommodation as shown in FIG. 17 is realized.

If the size of the nonaqueous electrolyte battery 10 is too large of if the size of the nonaqueous electrolyte battery 10 disperses, the insertion operation cannot smoothly be performed.

In the present invention, the corners of the beat welded portion 2a is cut and the adhesive agent is used to secure the heat welded portions. Therefore, the size is not enlarged excessively and the dispersion of the size can be prevented. Hence it follows that the insertion operation can smoothly be performed.

EXAMPLES

Examples and comparative examples of the present invention will now be described by using results of experiments.

Sample batteries were manufactured by the following method and evaluated as follows.

Manufacture of Sample Batteries

Initially, the negative electrode was manufactured as follows.

Ninety parts by weight of pulverized graphite powder and 10 parts by weight of poly (vinylidene fluororide-co-hexafluoropropylene) were mixed with each other so that a mix for the negative electrode was prepared. Then, the mix was dispersed in N-methyl-2-pyrolidone so as to be slurried. The slurry was equally applied to either surface of elongated copper foil which was a collector for the negative electrode and which had a thickness of 10 $\mu$m. Then, the slurry was dried, and then the foil was compressed by a roll press so that the negative electrode was manufactured.

The positive electrode was manufactured as follow.

To obtain active material (LiCoO$_2$) for the positive electrode, lithium carbonate and cobalt carbonate were mixed with each other at a molar ratio of 0.5:1, and then the mixture was baked in air at 900° C. for 5 hours. Then, 91 parts by weight of obtained LiCoO$_2$, 6 parts by weight of graphite serving as a conductive material and 10 parts by weight of poly (vinylidene fluororide-co-hexafluoropropylene) were mixed with one another so that a mix for the positive electrode was prepared. Then, the mix was dispersed in N-methyl-2-pyrolidone so as to be slurried. The slurry was uniformly applied to either surface of elongated aluminum foil serving as a collector for the positive electrode and having a thickness of 20 $\mu$m. After the slurry was dried, the foil was compressed by a roll press so that the positive electrode was manufactured.

Then, gel electrolyte was obtained as follows.

The surfaces of the negative electrode and the positive electrode were uniformly coated with solution. The solution was prepared by mixing and solving 10 parts by weight of poly (vinylidene fluororide-co-hexafluoropropylene) having a weight average molecular weight of 600,000 and 60 parts by weight of diethyl carbonate in 30 parts by weight of plasticizer composed of 42.5 parts by weight of ethylene carbonate (EC), 42.5 parts by weight of propylene (PC) and 15 parts by weight of LiPF$_6$. The surfaces were impregnated with the solution, and then the electrodes were allowed to stand at room temperatures for 8 hours to vaporize and remove dimethyl carbonate so that gel electrolyte was obtained.

The gel electrolyte portions of the negative electrode and the positive electrode coated with the gel electrolyte were joined and pressed against each other. Thus, a flat gel-electrolyte battery having an area of 3.3 cm×5.2 cm, a thickness of 0.3 mm and a capacity of 50 mAh and a flat gel-electrolyte battery having an area of 3.3 cm×5.2 cm, a thickness of 3.3 mm and a capacity of 550 mAh were manufactured.

A positive-electrode terminal lead made of aluminum and a negative-electrode terminal lead made of nickel were welded to the portions of the electrode plates in which no active-material layers were applied (the aluminum foil of the positive electrode and the copper foil of the negative electrode). Then, the battery was inserted into a case constituted by a laminate film. Then, heat welding was performed for 10 seconds at 200° C. by a sealing machine for a sealing width of 5 mm. Thus, test batteries were manufactured.

Existence of Cut Portion and Shape

The structure of the manufactured samples were as follows.

Sample 1: a cut portion in the form of a stepped shape as shown in FIG. 5 was formed.

Sample 2: a diagonal cut portion as shown in FIG. 4 was formed to the second bending line L2 (the size of the cut portion: 2.7 mm (in the widthwise direction which is perpendicular to the bending line)×6.5 mm (in the lengthwise direction along the bending line).

Sample 3: a diagonal cut portion as shown in FIG. 3 was formed to the first bending line L1 (the size of the cut portion: 6.2 mm×6.2 mm).

Comparative Sample: no cut portion.

Figure 18:
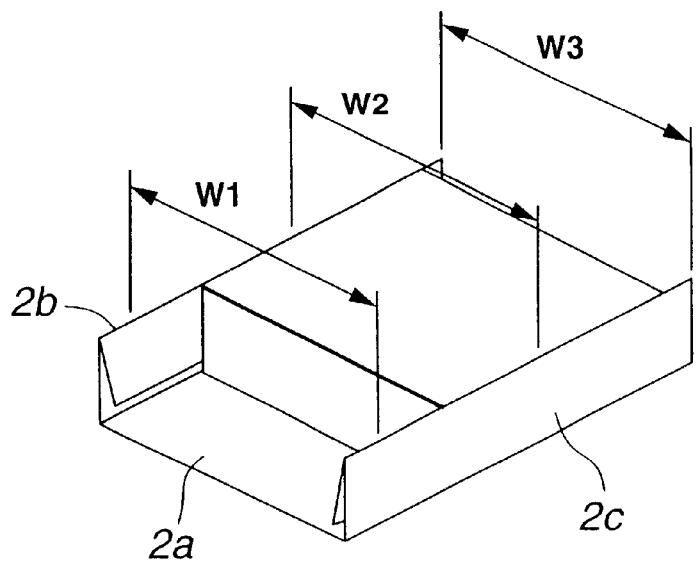
FIG. 18 is a schematic view showing measured sizes.
Figure 19:
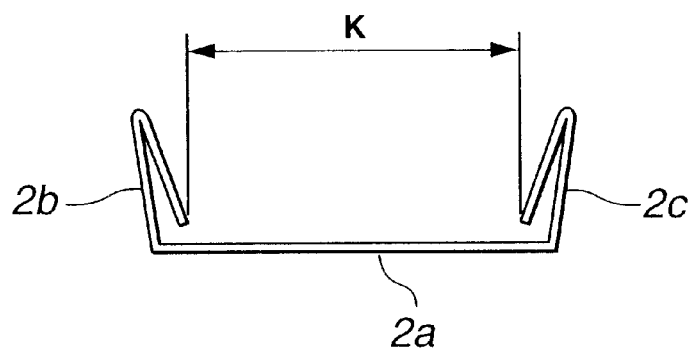
FIG. 19 is a schematic view showing dimensions of a space for accommodating the control circuit.

Sizes W1, W2 and W3 of each sample shown in FIG. 18 were measured. Moreover, dimension K of the space for accommodating the control circuit 5 shown in FIG. 19 was measured. Results of the measurement of each sample were shown in Tables 1 to 4.

TABLE 1

|  | W-1 | W-2 | W-3 | K |
| --- | --- | --- | --- | --- |
| average | 34.75 | 34.73 | 34.79 | 33.26 |
| σ value | 0.159 | 0.142 | 0.139 | 0.019 |

TABLE 2

|  | W-1 | W-2 | W-3 | K |
| --- | --- | --- | --- | --- |
| average | 34.74 | 34.69 | 34.71 | 33.19 |
| σ value | 0.162 | 0.153 | 0.149 | 0.058 |

TABLE 3

|  | W-1 | W-2 | W-3 | K |
| --- | --- | --- | --- | --- |
| average | 34.68 | 34.63 | 34.66 | 33.21 |
| σ value | 0.132 | 0.124 | 0.121 | 0.049 |

TABLE 4

|  | W-1 | W-2 | W-3 | K |
| --- | --- | --- | --- | --- |
| average | 34.85 | 34.79 | 34.78 | 33.17 |
| σ value | 0.196 | 0.125 | 0.135 | 0.085 |

As compared with the structure having no cut portion (the comparative example), the size K of the space of each of Samples 1 to 3 for accommodating the control circuit 5 was enlarged.

Although the sizes W1, W2 and W3 of the Samples 1 to 3 were reduced, the sizes were instable and encountered great dispersion.

When the samples were compared, Sample 1 exhibited satisfactory results. However, a problem arisen in a water resistance test and the corners of the cut portions were difficult to stably be formed. Moreover, the sealing length raised a problem.

Sample 2 exhibited satisfactory results and no problem was raised in the water resistance test. However, the folding operation cannot easily be performed.

Sample 3 was able to overcome the problems experienced with Samples 1 and 2. Therefore, the shape of Sample 3 was a most satisfactory shape.

Existence of Adhesive Agent

The foregoing comparative samples were free of fixation by using the adhesive agent. Samples having similar structures were secured with the adhesive agent. The foregoing structure was employed as Sample 4.

Also Sample 4 was measured similarly. Results were shown in Table 5.

TABLE 5

|         | W-1   | W-2   | W-3   | K     |
|---------|-------|-------|-------|-------|
| average | 34.65 | 34.60 | 34.54 | 33.10 |
| σ value | 0.101 | 0.045 | 0.035 | 0.045 |

As compared with the comparative samples, application of the adhesive agent improved the sizes W1, W2 and W3. Note that the size K of the space for accommodating the control circuit 5 was free of remarkable change.

Cut Portion+Adhesive Agent

Therefore, samples having a structure obtained by combining the cut portion and fixation using the adhesive agent were manufactured.

The structures of the manufactured samples were as follows.

Sample 5: the stepped portion as shown in FIG. 5 was formed. The adhesive agent was used to fix the structure.

Sample 6: the diagonal cut portion as shown in FIG. 4 was formed to the second bending line L2. The adhesive agent was used to fix the structure.

Sample 7: The diagonal cut portion as shown in FIG. 3 was formed to the first bending line L1. The adhesive agent was used to fix the structure.

Also the Samples 5 to 7 were similarly measured. Results were shown in Tables 6 to 8.

TABLE 6

|         | W-1   | W-2   | W-3   | K     |
|---------|-------|-------|-------|-------|
| average | 34.67 | 34.58 | 34.54 | 33.24 |
| σ value | 0.111 | 0.04  | 0.04  | 0.012 |

TABLE 7

|         | W-1   | W-2   | W-3   | K     |
|---------|-------|-------|-------|-------|
| average | 34.70 | 34.54 | 34.49 | 33.14 |
| σ value | 0.09  | 0.04  | 0.03  | 0.025 |

TABLE 8

|         | W-1   | W-2   | W-3   | K     |
|---------|-------|-------|-------|-------|
| average | 34.6  | 34.54 | 34.51 | 33.17 |
| σ value | 0.06  | 0.035 | 0.03  | 0.019 |

The samples constituted by combining the cut portion and securing by using the adhesive agent resulted in enlargement of the size K for accommodating the control circuit 5. Moreover, the sizes W1, W2 and W3 were improved.

As can be understood from the foregoing description, according to the present invention, enlargement of the size can be prevented while the sufficiently large space for accommodating the control circuit is being maintained. Therefore, a nonaqueous electrolyte battery exhibiting excellent volume efficiency can be provided.

The nonaqueous electrolyte battery according to the present invention can easily be manufactured and permits an easy insertion operation into a case. Therefore, the productivity can significantly be improved.

Although the invention has been described in its preferred form and structure with a certain degree of particularity, it is understood that the present disclosure of the preferred form can be changed in the details of construction and in the combination and arrangement of parts without departing from the spirit and the scope of the invention as hereinafter claimed.

What is claimed is:

1. A nonaqueous electrolyte battery comprising:
   a case constituted by a laminate film and arranged to accommodate a battery element which is enclosed by heat welding; and
   electrode terminal leads which are electrically connected to electrodes constituting the battery element and which are extended to the outside of said case such that said electrode terminal leads are sandwiched by a heat welded portion, wherein
   the nonaqueous electrolyte battery has a rectangular outer shape,
   two corners of one side of four sides of said nonaqueous electrolyte battery from which said electrode terminal leads extend to the outside of said nonaqueous electrolyte battery are cut, bent such that the width of each of heat welded portions corresponding to the other sides is smaller than the thickness of said nonaqueous electrolyte battery and inwards folded back along the side surface of the battery element so that a space is created and
   a control circuit for said nonaqueous electrolyte battery is accommodated in the space.

2. A nonaqueous electrolyte battery according to claim 1, wherein the two corners of the heat welded portions are diagonally cut.

3. A nonaqueous electrolyte battery according to claim 1, wherein each of the two corners of the heat welded portions is cut into a circular-arc shape.

4. A nonaqueous electrolyte battery according to claim 1, wherein each of the two corners of the heat welded portions is cut into a stepped shape.

5. A nonaqueous electrolyte battery according to claim 1, wherein the folded heat welded portions are secured with adhesive agent.

6. A nonaqueous electrolyte battery according to claim 1, wherein said case is subjected to deep drawing to create the space for accommodating the battery element.

7. A nonaqueous electrolyte battery according to claim 1, wherein the control circuit is formed on a flexible printed circuit board, and terminals formed on the flexible printed circuit board are connected to said electrode terminal leads.

8. A nonaqueous electrolyte battery according to claim 1, wherein the electrolyte for constituting the battery element is a gel electrolyte or a solid electrolyte containing a matrix polymer and a lithium salt.

9. A nonaqueous electrolyte battery according to claim 1, wherein the negative electrode for constituting the battery element contains material which is capable of doping/dedoping lithium.

10. A nonaqueous electrolyte battery according to claim 9, wherein the material which is capable of doping/dedoping lithium is carbon material.

11. A nonaqueous electrolyte battery according to claim 1, wherein the positive electrode for constituting the battery element is a positive electrode containing a composite oxide of lithium and transition metal.

12. A nonaqueous electrolyte battery according to claim 1, wherein said nonaqueous electrolyte battery is a secondary battery.

13. A nonaqueous electrolyte battery according to claim 1, wherein the battery element is accommodated in a container together with said case and the control circuit.

* * * * *